July 28, 1959 H. GERBER Re. 24,672
ALARM SYSTEM
Original Filed June 16, 1955
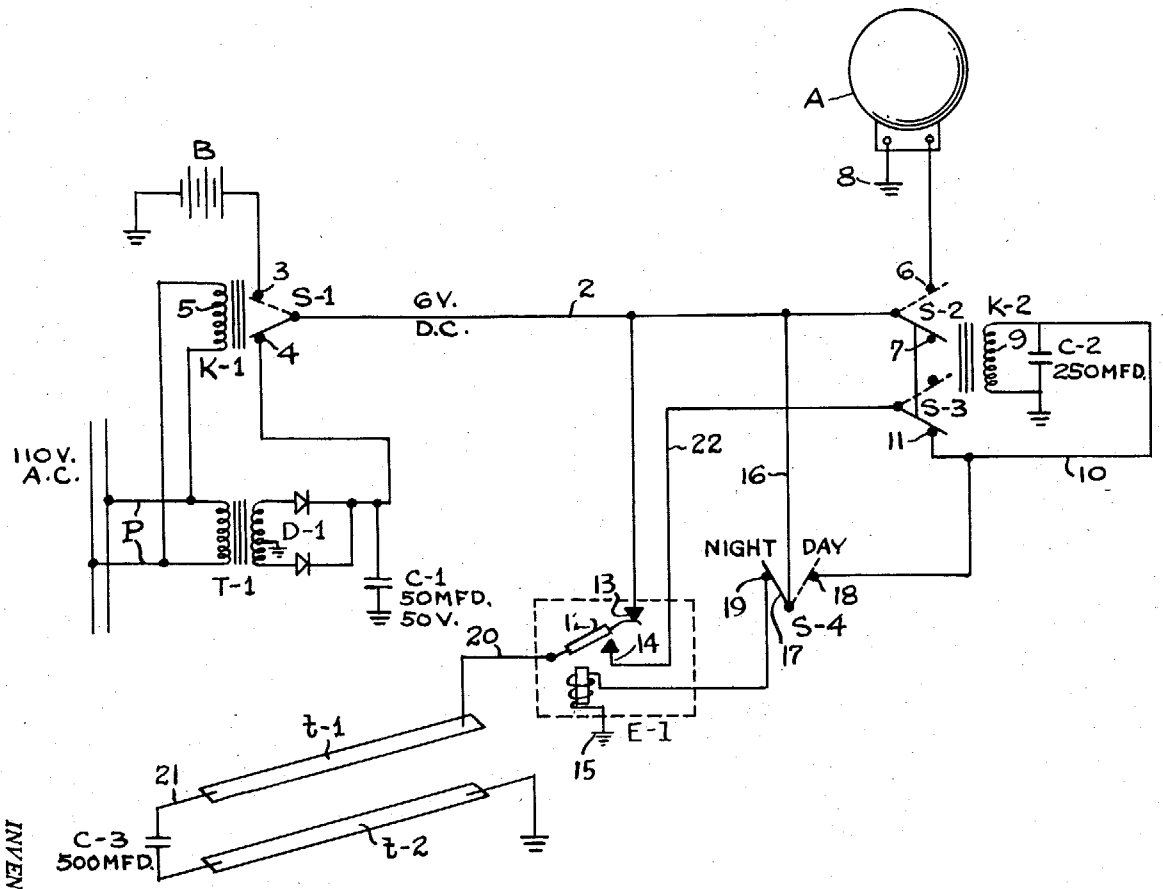
INVENTOR:
Harry Gerber
BY
N. J. Stevenson United States Patent Office Re. 24,672
Reissued July 28, 1959

24,672

ALARM SYSTEM

Harry Gerber, Glendale, Calif., assignor to Simplex Industrial Products, Inc., Glendale, Calif., a corporation of California Original No. 2,771,598, dated November 20, 1956, Serial No. 515,951, June 16, 1955. Application for reissue April 28, 1958, Serial No. 732,414

8 Claims. (Cl. 340—276)

Matter enclosed in heavy brackets [ ] appears in the original patent but forms no part of this reissue specification; matter printed in italics indicates the additions made by reissue.

This invention relates to burglar alarm systems and particularly to a system in which a conductive tape is incorporated, fracturing of the tape by a burglar energizing a circuit to set off a bell or other warning device embodied in the circuit.

Burglar alarm systems of the general character referred to above are widely used to warn of the entrance into buildings by unauthorized persons. In such conventional electric alarm systems, the tape or tapes are installed on windows and doors so that in order to gain access to the interior of a building breaking or jumping of a tape is necessary. Such conventional alarm systems utilize batteries as the source of D.C. current at the subscriber's location, this current being used to energize a relay so as to normally maintain a bell circuit open, and a second set of batteries to operate the bell if the relay is deenergized. Consequently, there exists a constant drain on the batteries so that it is necessary to replace the batteries at frequent intervals. This results in appreciable operating and upkeep costs which is reflected in increased charges to the store proprietors and other persons subscribing to the burglar alarm service. In the event of a run-down battery condition, the alarm circuit is rendered ineffective and when this situation prevails the protection afforded by the system is nullified. Moreover, due to the fact that no time delay means is employed, jarring of the window or door, due to gusts of wind, earth tremors, etc., may initiate immediate action of the system so that the alarm may erroneously indicate the presence of an intruder.

Other burglar alarm systems proposed in the past have operated on A.C. current but such systems have the disadvantage that they are rendered inoperative in the event of power failure and require power supplies and stand-by batteries at both the subscriber location and the central location.

It is an object of the present invention to obviate the disadvantages of the prior burglar alarm systems referred to above by providing a system which normally is operated from a main D.C. current rectified from an A.C. power source but has incorporated therein an auxiliary D.C. current source and an automatic switching means operative in response to current failure in the main current supply, to connect the system to the auxiliary D.C. supply which is in the nature of batteries. A related object of the invention is to provide an alarm system which operates under low D.C. current, the A.C. power supply being transformed and rectified for this purpose.

Another object of the invention is to provide a burglar alarm system, of the character referred to, in which the switching means operates to re-connect the system to the main power source when the power is restored. By this provision, the batteries of the auxiliary supply are conserved so that they will remain active over a long period of time.

Another object of the invention is to provide an alarm system which embodies a bell or other electric warning device, and a relay for controlling the energization of the bell circuit, the relay including a bell switch normally maintained open by the relay coil so as to render the bell circuit inactive, deenergization of the relay coil allowing closing of the switch to energize the bell circuit and thus effect ringing of the bell or other warning device. In accordance with the present concept, the alarm system also includes a vibrator device having a pair of poles, the first pole being connected to the current source and the second pole being connected, through a switch, to the relay coil, the oscillating vibrator arm being arranged when in contact with the first pole, to convey current through a pair of conductive tapes connected in series and thence to ground. When the vibrator arm is in its other position, it is adapted to convey current to the relay coil to energize the same.

As a particular feature and object of the invention, a first electric storage means in the form of a condenser is connected in series in the circuit between the tapes and a second condenser of less capacity than the first condenser is connected across the bell relay coil. By this provision, during actuation of the vibrator arm electric charges are caused to flow intermittently from the supply line to the first condenser to be stored therein, when the arm contacts the first pole of the vibrator device. At each contact of the arm with the second pole, the electric charge stored in the first condenser is released to flow to the bell relay coil so as to maintain the bell circuit open. At the same time, a certain amount of the electric charge in the second condenser is then released to maintain the bell relay coil energized when the vibrator arm disengages the first pole to again contact the second pole. Thus, the condensers are activated successively to maintain the bell relay energized and this condition will exist so long as the conductive tapes remain unbroken. Upon fracture of a tape or jumper between tapes, the first condenser circuit is opened or shorted so that energization of the bell relay is disrupted to allow closing of the bell circuit to effect ringing of the warning bell. This eliminates the need for batteries at the subscriber's end.

Another object of the invention is to provide a burglar alarm system embodying means by which the system may be conveniently rendered operative for night duty and de-activated during the day. This means consists of a control switch having a first, day contact connected to the bell relay coil and a second, night contact connected to the vibrator unit, the actuator arm of the switch being electrically connected to the main current line at all times. By this specific arrangement, throwing of the control switch to its "night" side effects energization of the vibrator unit to activate the bell relay and thus inactivate the alarm bell, and throwing of the switch to its "day" side causes inactivation of the vibrator unit but energization of the bell relay so as to maintain its bell switch open.

Further objects of the invention will appear from the following description and from the single drawing which is intended for the purpose of illustration only and which is an electrical diagram of the burglar alarm system.

Referring to the drawing in detail, the electrical system includes a transformer T–1, the input side of which is connected to a 110 v. A.C. power line P. The output side of the transformer T–1 includes a dry disc rectifier D–1, the 110 v. A.C. current being rectified to 6 v. D.C. Filtering is accomplished by condenser *or capacitor means* C–1. The 6 v. D.C. current flows to a main current line 2 by way of a main relay switch S–1 of a main relay K–1, the switch having contacts 3 and 4. The relay K–1 has its coil 5 connected to the power line P to normally maintain the actuator arm of the switch S–1 in engagement with the contact 4. The other contact 3 is connected to a battery B.

During normal conditions, the 6 v. D.C. current is supplied to the line 2 through the switch S–1, the actuator arm of which normally engages contact 4 in response to the continuous energization of the relay T–1. In the event of failure of the main power supply, the relay K–1 is deenergized to allow shifting of the actuator arm to the contact 3 so as to automatically connect the battery B to the main current line 2. Thus, the relay switching unit K–1 renders the alarm system fool-proof by preventing inactivation of the system in the event of main power failure.

The line 2 is connected to the actuator arm of a bell switch S–2 having contacts 6 and 7, the former being connected to a pole of an alarm bell A grounded at 8. The bell switch S–2 is controlled by a bell relay K–2 having a coil 9, one side of which is connected by a wire 10 to the contact 11 of a second switch S–3 also controlled by the relay K–2. Connected across the relay coil 9 is a first condenser *or capacitor means* C–2.

The system also includes a vibrator unit E–1 having a vibrator arm 12 oscillatable between contacts 13 and 14. *The vibrator unit E–1 is of a well known construction and is shown only diagrammatically.* The vibrator unit E–1 is grounded at 15 and is energized from the line 2 through a wire 16 connected to the actuator arm 17 of a "day-night" control switch S–4. This switch has a "day" contact 18 connected to the wire 10 and a "night" contact 19 connected to the vibrator unit E–1. When the switch S–4 is closed through contact 19, current flows to the vibrator unit to energize the same and thus oscillate the arm 12 to successively engage the contacts 13 and 14. The contact 13 is electrically connected to the main current line 2 so that upon momentary engagement thereof by the arm 12, current is caused to flow through a line 20 to one end of a conductive tape t–1. The tape t–1 is connected to a second grounded tape t–2 by a wire 21 in which is interposed a second condenser *or capacitor means* C–3. It is to be noted that the condenser C–3 has twice the capacity of condenser C–2. Contact 14 of the vibrator unit E–1 is connected by a wire 22 to the actuator arm of relay switch S–3. Ground connections are shown for simplification only and may be replaced by connecting all grounds together with a wire.

Assuming that the line 2 is being supplied with current from either the transformer T–1 or the battery B, and that the control switch S–4 is closed through its day contact 18, current flows from line 2, arm 17 and contact 18 to wire 10 so as to energize the bell relay K–2 and thus cause the switches S–2 and S–3 to assume the positions shown in the drawing.

To set the system for operation, the control switch S–4 is shifted to close the "night" contact 19 and during this shifting the holding relay K–2 maintains the switches S–2 and S–3 in the positions shown. Closing of the switch S–4 through the contact 19 energizes the vibrator unit E–1 to oscillate its arm 12.

Momentary engagement of the arm with the contact 13 causes current flow through the tape t–1 *to charge the condenser C–3* [and through the wire 21 and condenser C–3 to the second tape t–2 and hence to ground. During this momentary flow of current through the tapes, a charge of electricity is stored up in the condenser C–3]. Now, as the arm 12 next momentarily engages contact 14, [the charge of electricity is released by the condenser C–3 and flows to the relay coil 9] *the condenser C–3 discharges* by way of line 22, closed switch S–3 and wire 10 to energize the relay *coil 9*. The condenser C–2 holds the relay energized between successive engagements of the vibrator arm 12 with the contact 14. It is thus seen that during one stroke of the vibrator arm 12, electric potential is accumulated in the condenser C–3 and at the completion of the oscillatory stroke of the arm in the other direction the charge is discharged to flow to the relay coil 9 and condenser C–2. Before the holding relay can become deenergized, another charge of current is delivered thereto.

This intermittent energization of the bell relay K–2 continues throughout the night hours to maintain the circuit to the bell A open. In the event that either tape t–1 or t–2 is broken or a jumper connected between t–1 or t–2, the circuit through the tape is opened or C–3 is shorted so that storing of electric potential in the condenser C–3 is impossible. Consequently, when this situation occurs, the relay K–2 is deenergized to allow closing of the bell circuit through the switch contact 6 so as to activate the alarm bell A. At the same time, a bell, light or other warning device on a master panel located remotely from the scene may be activated through a telephone line connected to the bell circuit. The alarm will, of course, remain energized until the broken tape is repaired and switch S–4 returned to the day position to reset holding relay K–2.

It is to be observed that the condenser C–2 serves two purposes, that is, to hold the relay K–2 energized while the condenser C–3 is being charged and to provide a time delay so as to avoid accidental setting off of the alarm in the event of temporary opening of the tape circuit due to gusts of wind, earth tremors, etc.

During the day, the alarm system is rendered inoperative by simply shifting the control switch S–4 to close the circuit through "day" contact 18. Current thus flows directly from line 2 to the relay K–2 which acts to maintain the bell switch S–2 open.

As previously indicated, failure of the main power supply P results in automatically closing the switch S–1 through its contact 3 so as to effect current flow from the battery B to the system. When power is restored, the switch is actuated by the relay K–1 to re-connect the line 2 to the transformer T–1. Thus, the battery B is employed only as an emergency source of electric current so that it will last over a long period of time. Since frequent replacement of batteries is unnecessary, replacement costs and service charges are reduced to a minimum. Further, in present conventional systems, batteries are necessary, in place of C–3, to protect against jumpering of t–1 to t–2, but in the improved system remote batteries at the subscriber's end are rendered unnecessary. *In fact, as will be apparent to those skilled in the art, not only the battery B but also the switches S–1, S–2, S–3, relay K–2, condenser C–2, switch S–4, and the vibrator unit E–1 may all be at a central station, the wire 20 being the sole connection between the subscriber and the central station.*

*With reference to the terms employed in the appended claims, the circuit comprising the vibrator arm 12, line 20, and conductor t–1 may be termed a detector circuit; the vibrator E–1 may be termed a cyclic switch; the circuit that comprises the relay coil K–2 may be termed a control circuit; and the circuit for energizing the alarm bell A may be aptly described as an alarm signal means that is responsive to the discharge of the two capacitor means for operation whenever either capacitor means fails to discharge, whereby the alarm signal means is normally inoperative but operates whenever said detector circuit is broken to prevent charging of said second capacitor means.*

In accordance with the provisions of the patent statutes, I have herein disclosed the principle of the invention, together with a preferred arrangement of electrical components which I now consider to represent the best embodiment of the invention. I wish to have it understood, however, that modifications might be made therein without departing from the spirit or scope of the invention, as defined in the appended claims.

I claim as my invention:

1. An electric alarm system, comprising: a low voltage D.C. line; an alarm device and circuit therefor, said circuit being energizable from said current line; an alarm switch interposed between said circuit and said current line, closing of said switch effecting energization of said alarm device; a relay operative, when energized, to maintain said alarm switch open; a first condenser shunted across the coil of said relay; a second relay switch having a contact electrically connected to said relay coil; an electric vibrator unit having a pair of spaced poles and a vibrator arm movable between the poles to alternately engage the same to establish electrical contact therewith, the first pole being connected to said current line and the second pole being connected to the actuator arm of said relay switch; an electric line connected between said current line and said vibrator unit for energizing the latter; a control switch in said electric line for opening and closing the same; a first metallic strip electrically connected to said vibrator arm; a second metallic strip connected to ground; and a second condenser connected between said strips, closing of said control switch causing current flow to said vibrator unit to energize the same, engagement of said vibrator arm with said first pole causing current flow through said tapes and charging of said second condenser, disengagement of said vibrator arm from said first pole and subsequent engagement of this arm with said second pole effecting discharge of the electric potential from said second condenser and current flow to said first condenser and said relay coil so as to energize said relay and thus maintain said alarm switch open and said relay switch closed, breaking or shorting of either of said metallic strips resulting in opening or shorting the circuit between said condensers and thus rendering said relay inactive to allow closing of said alarm switch and energization of said alarm device.

2. An electric alarm system, comprising: a low voltage D.C. current line; an electric alarm device connectible to said line to be energized thereby; an alarm switch interposed between said line and said device; a holding relay operative, when energized, to maintain said alarm switch open; an electric vibrator unit connected to said current line to be energized therefrom, said unit having a first pole, a second pole and a movable vibrator element engageable alternately with said poles, said first pole being electrically connected to said current line and said second pole being electrically connected to said holding relay; a line connected between said vibrator arm and ground; a pair of metallic strips connected in series in said line; and an electric potential accumulator in said last-named line adapted to receive and store an electric charge upon engagement of said vibrator arm with said first pole, said potential being discharged from said accumulator to flow to said holding relay to energize the same upon engagement of said vibrator arm with said second pole, energization of said relay maintaining said alarm switch open, breaking or shorting of either of said metallic strips resulting in opening or shorting the circuit between said condensers and thus rendering said relay inactive to allow closing of said alarm switch and energization of said alarm device.

3. A system as defined in claim 1 in which said control switch has a first contact connected to said vibrator unit, a second contact connected to said relay coil and said first condenser, and an actuator arm engageable selectively with said first and second contacts and electrically connected to said current source.

4. A system as defined in claim 1 in which said second condenser is of higher capacity than said first condenser.

*5. In an alarm system, the combination of: a first capacitor means; a second capacitor means; a detector circuit including said second capacitor means; an E.M.F. source; a continuously operating cyclic switch means energized by said E.M.F. source to connect said detector circuit with said first capacitor means for a first time period to discharge said second capacitor means and thereby charge said first capacitor means and alternately to connect the detector circuit with said E.M.F. source for a second time period to charge said second capacitor means; means to discharge said first capacitor means during said second time period, the duration of the discharge of said first capacitor means extending substantially over said second time period and the duration of the discharge of said second capacitor means extending substantially over said first time period whereby the two capacitors cooperate to discharge current substantially continuously; and an alarm signal means responsive to the discharge of the two capacitor means for operation whenever either fails to discharge, whereby the alarm signal means is normally inoperative but operates whenever said detector circuit is broken to prevent charging of said second capacitor means.*

*6. A combination as set forth in claim 5 which includes switch means to connect said E.M.F. source with said alarm signal means to prevent operation thereof thereby to make the alarm signal means nonresponsive to said detector circuit.*

*7. In an alarm system, the combination of: a control circuit; a first capacitor means for discharge to energize said control circuit; a second capacitor means; a detector circuit including said second capacitor means; an E.M.F. source; a continually operating cyclic switch means energized by said E.M.F. source to connect said detector circuit with both said control circuit and said first capacitor means and alternately with said E.M.F. source to keep said control circuit substantially continuously energized by the alternate discharge of said two capacitor means; and an alarm signal means responsive to said control circuit to operate whenever the control circuit is deenergized whereby the alarm signal means is normally inoperative but operates whenever said detector circuit is broken to prevent charging of said second capacitor means.*

*8. In an alarm system, the combination of: a detector circuit including a capacitor means; an E.M.F. source, continuously operable means energized by said E.M.F. source to energize said detector circuit periodically for alternately charging and discharging of said capacitor means; a control circuit periodically energized by the discharge of said capacitor means; means to energize said control circuit periodically at time periods alternating with the time periods of discharge of said capacitor means whereby the control circuit is substantially continuously energized; and an alarm signal means responsive to said control circuit to operate whenever the control circuit is deenergized, whereby the alarm signal means is normally inoperative but operates whenever said detector circuit is broken to prevent charging of said capacitor means.*

References Cited in the file of this patent or the original patent

UNITED STATES PATENTS

| | | |
|---|---|---|
| 2,041,540 | Goldstone | May 19, 1936 |
| 2,346,171 | Laford | Apr. 11, 1944 |
| 2,473,542 | Philpott | June 21, 1949 |